United States Patent
Gravoille

(10) Patent No.: US 8,879,893 B2
(45) Date of Patent: Nov. 4, 2014

(54) SCRAMBLING AND DESCRAMBLING METHOD FOR THE TRANSPORT OF MPEG2 AUDIO VIDEO DATA STREAMS

(75) Inventor: Pascal Gravoille, Cesson-Sevigne (FR)

(73) Assignee: France Brevets, Paris (FR)

( * ) Notice: Subject to any disclaimer, the term of this patent is extended or adjusted under 35 U.S.C. 154(b) by 517 days.

(21) Appl. No.: 12/737,299

(22) PCT Filed: Jun. 29, 2009

(86) PCT No.: PCT/EP2009/058102
§ 371 (c)(1),
(2), (4) Date: Mar. 4, 2011

(87) PCT Pub. No.: WO2010/000692
PCT Pub. Date: Jan. 7, 2010

(65) Prior Publication Data
US 2011/0158609 A1 Jun. 30, 2011

(30) Foreign Application Priority Data
Jul. 2, 2008 (FR) .................. 08 54481

(51) Int. Cl.
| | |
|---|---|
| H04N 9/80 | (2006.01) |
| H04N 21/2389 | (2011.01) |
| H04N 21/434 | (2011.01) |
| H04N 21/4385 | (2011.01) |
| H04N 21/236 | (2011.01) |
| H04N 7/167 | (2011.01) |
| H04H 60/23 | (2008.01) |
| H04H 20/74 | (2008.01) |

(52) U.S. Cl.
CPC ......... *H04N 21/23608* (2013.01); *H04H 60/23* (2013.01); *H04H 20/74* (2013.01); *H04N 21/23895* (2013.01); *H04N 21/4344* (2013.01); *H04N 21/43853* (2013.01); *H04N 7/1675* (2013.01)
USPC ........................................ 386/258

(58) Field of Classification Search
USPC .......................................................... 386/258
See application file for complete search history.

(56) References Cited

U.S. PATENT DOCUMENTS

| | | | |
|---|---|---|---|
| 6,307,939 B1 | 10/2001 | Vigarie | |
| 7,085,381 B2 * | 8/2006 | Kubota et al. | 380/210 |
| 2005/0163318 A1 * | 7/2005 | Duffield et al. | 380/268 |

FOREIGN PATENT DOCUMENTS

| | | |
|---|---|---|
| EP | 0666694 | 8/1995 |
| WO | WO9808341 | 2/1998 |
| WO | WO2004098170 | 11/2004 |

OTHER PUBLICATIONS

European Broadcasting Union, "Digital Video Broadcasting (DVB); Support for Use of Scrambling and Condtional Access (CA) Within Digital Broadcasting Systems", ETSI Standards, vol. BC, Cedex, France, Oct. 1, 1996.
"Functional Model of a Conditional Access System", EBU Review—Technical, European Broadcasting Union, No. 266, Brussels, BE, Dec. 21, 1995, pp. 64-77.
Search Report Dated Oct. 1, 2009.

* cited by examiner (Continued)

*Primary Examiner* — Thai Tran
*Assistant Examiner* — Jose Mesa
(74) *Attorney, Agent, or Firm* — Tutunjian & Bitetto, P.C.

(57) ABSTRACT

A scrambling and descrambling method that includes reading of original PID and TSC bits in the PID and TSC fields of a packet header of an MPEG2 stream which is at least partially scrambled. A temporary PID may be written in a PID field in place of the original PID, and may be a function of the original PID value and TSC bits according to a correspondence table of an original PID and TSC bits with the temporary PIDs. The value zero may be written in the TSC field in place of the original value, and scrambling of the stream with modified fields may occur. Applications include the satellite transmission of partially scrambled MPEG2 digital signals.

11 Claims, 2 Drawing Sheets

| PID | a | a | a | a | a | a | a | a | a | a | a | a | a |
|---|---|---|---|---|---|---|---|---|---|---|---|---|---|
| TSC | 00 | 10 | 10 | 11 | 11 | 11 | 11 | 11 | 10 | 10 | 00 | 10 | 10 |
| CC | 1010 | 1011 | 1100 | 1101 | 1111 | 0000 | 0001 | 0010 | 0011 | 0100 | 0101 | 0110 | 0111 |

| PID | l | | | | | | | | l | | | |
|---|---|---|---|---|---|---|---|---|---|---|---|---|
| TSC | 00 | | | 9 | | | | 10 | 00 | | | |
| CC | 1011 | | | | | | | | 0101 | | | |

| PID | n | n | | Continuity counter error | | | n | n | | n | n |
|---|---|---|---|---|---|---|---|---|---|---|---|
| TSC | 00 | 00 | | | | | 00 | 00 | | 00 | 00 |
| CC | 1100 | 1101 | | | | | 0011 | 0100 | | 0110 | 0111 |

| PID | | | o | o | o | o | o | | | | | |
|---|---|---|---|---|---|---|---|---|---|---|---|---|
| TSC | | | 00 | 00 | 00 | 00 | 00 | | | | | |
| CC | | | 1110 | 1111 | 0000 | 0001 | 0010 | | | | | |

FIG. 4

| PID | a | a | a | a | a | a | a | a | a | a | a | a | a |
|---|---|---|---|---|---|---|---|---|---|---|---|---|---|
| TSC | 00 | 10 | 10 | 11 | 11 | 11 | 11 | 11 | 10 | 10 | 00 | 10 | 10 |
| CC | 1011 | 1100 | 1101 | 1110 | 1111 | 0000 | 0001 | 0010 | 0011 | 0100 | 0101 | 0110 | 0111 |

| PID | l | | | | | | | | | l | | | |
|---|---|---|---|---|---|---|---|---|---|---|---|---|---|
| TSC | 00 | | | | | | | | | 00 | | | |
| CC | 0010 | | | | | | | | | 0011 | | | |

| PID | n | n | | | | | n | n | | n | n |
|---|---|---|---|---|---|---|---|---|---|---|---|
| TSC | 00 | 00 | | | | | 00 | 00 | | 00 | 00 |
| CC | 0100 | 0101 | | | | | 0110 | 0111 | | 1000 | 1001 |

| PID | | | o | o | | o | o | | | | |
|---|---|---|---|---|---|---|---|---|---|---|---|
| TSC | | | 00 | 00 | | 00 | 00 | | | | |
| CC | | | 0001 | 0010 | | 0011 | 0100 | | | | |

| PID | | | | s | | | | | | | |
|---|---|---|---|---|---|---|---|---|---|---|---|
| TSC | | | | 00 | | | | | | | |
| CC | | | | 0011 | | | | | | | |

FIG. 5

SCRAMBLING AND DESCRAMBLING METHOD FOR THE TRANSPORT OF MPEG2 AUDIO VIDEO DATA STREAMS

This application claims the benefit, under 35 U.S.C. §365 of International Application PCT/EP2009/058102, filed on Jun. 29, 2009, which was published in accordance with PCT Article 21(2) on Jan. 7, 2010 in English and which claims the benefit of French patent application No. 0854481, filed on Jul. 2, 2008.

DOMAIN OF THE INVENTION

The present invention relates to the domain of video compression and of compressed data scrambling. More specifically it relates to over-scrambling for MPEG2 audio video data stream transport.

PRIOR ART

The ISO 13818-1 MPEG2-System standard and the ETSI ETR289 standard describe a scrambling/descrambling method of an MPEG2 TS (Transport Stream). The scrambling/descrambling synchronisation method is based on the use of 2 transport scrambling control bits found in the packet header, designated by the letters TSC (Transport Scrambling Control). Their signification is as follows:

| | |
|---|---|
| 00 | Not scrambled |
| 01 | Reserved |
| 10 | TS Packet scrambled with even key |
| 11 | TS Packet scrambled with odd key |

The TSC field is completed by the scrambler according to whether the packet is scrambled or not and, in the case of scrambling, according to the parity of the key used.

The descrambler uses this TSC field to apply or not packet descrambling and, in the first case, with the appropriate key.

FIG. 1 shows in a diagrammatic way the state of TSC bits during scrambling and descrambling operations. The original stream, that is to say non-scrambled stream, whose TSC field of packet headers is at 00, is transmitted to a scrambler referenced 1. At the output of this scrambler, the TSC field of the scrambled stream is at 00, 10 or 11 according to whether the corresponding packet is non-scrambled, scrambled with an even key or scrambled with an odd key. The scrambled stream is then transmitted to a descrambler referenced 2 that uses the TSC field to carry out inverse operations to the scrambler. The TSC field of the stream at the output of the descrambler, the stream corresponding to the original stream, is reset to 00 in order to indicate that the packet is in clear.

The use of broadcast systems or networks may require, in some parts of the network, ensuring that the stream is scrambled whatever its nature, whether it's scrambled or in clear. From an operational point of view, it is easier to scramble an entire signal without being concerned to know if a part of it is in clear or already scrambled. This means that a stream that is already scrambled can be scrambled again using another scrambler/descrambler pair. Some packets will then be scrambled twice, that is to say over-scrambled.

Generally signals transmitted by satellite must be scrambled. Thus, the MPEG-TS stream transported by satellite link to supply the regional sites of a country, for example transmitters transmitting terrestrial digital television, is usually an encrypted TS stream. In fact, the operator using the satellite link wants to remain master of the end user regions or countries of signals transported by this satellite link, the descrambling at the level of terrestrial transmitters enabling control on the ground of the areas to be served. This may involve management of broadcast rights in a country covered by the satellite, the rights being for example attributed to other operators for the other country, management of programmes specific to regions, for example regional programmes, management of copyright that depend upon the public concerned, etc.

Within the context of a transmission by satellite, the signal is transmitted from a centralized transmission point to the satellite. This latter transmits the signal to satellite receivers on the ground that supply the terrestrial transmitters for the transmission of terrestrial digital television signals or DVB. The satellite transponder generally transmits several services or programmes on the same TS transport stream, the services being multiplexed. Moreover, the set of services is transported, between the satellite receiver and the television receiver, over several frequencies, each frequency itself being able to contain several services.

Hence, in the case where all the services are supposed to be in clear, the solution consists in scrambling the signal at the centralized transmission point to descramble it at the level of the satellite receiver. In the case where all the services are scrambled, no specific scrambling at the satellite transmission is necessary. But the most usual case is that where the transported stream contains both scrambled and unscrambled services, for example paying television services or programmes requiring a conditional access and free services or programmes. In the case of mixed scrambling, services encrypted for conditional access or for management of broadcast areas as seen previously and for the services in clear, a solution could be to only scramble the services in clear to obtain a complete scrambling of the transport stream transmitted to the satellite, the descrambler, at the base of the satellite receiver, then only descrambles the services in clear, the other services not being processed. This solution however is not optimal. The conditional processing of scrambling complicates use, the scrambling and descrambling circuits must take account of the state of each of the services. Moreover, the state of a service, scrambled or non-scrambled, can change over time, programmes being at times broadcast in clear during one part of the day and encrypted the rest of the time. Equally, the exact time of state change is not always known, for example as during the transmission of live programmes such as sports programmes. Finally, the management of state information in transport streams does not enable reaction except after a certain time delay for scrambling and descrambling, due to the processing time, degrading the quality of service. It would be for example, the transmission of a first few packets in double scrambling, after the encrypted passage of the service, providing scrambled images on the television.

Another solution would consist in scrambling the set of transport streams, without taking account of services already scrambled. The operator using the satellite link would encrypt the entire TS stream to transmit it, which would as a consequence create a double scrambling for the paying service. The "paying service" components, that is, the conditional access services would be scrambled twice. However the ISO/DVB (Digital Video Broadcast) mechanism that defines the TSC fields, as described above, does not permit such an over-scrambling. In fact the specification relating to TSC bits prevents an adapted management of TSC field bits during an over-scrambling as shown hereafter.

FIG. 2 shows the processing of the required stream. The original stream is scrambled by a first scrambler referenced 3 to provide a scrambled stream A. This stream is scrambled by a second scrambler referenced 4 to provide a scrambled stream B. On reception of the signal, a first descrambler referenced 5 descrambles the scrambled stream B to provide the scrambled stream A. This stream is descrambled a second time by a second descrambler referenced 6 to provide the original stream.

The changes in the TSC field bits during these scrambling/descrambling operations are as follows. The original stream is transmitted to the scrambler A and the TSC bits of scrambled stream A at the output of this scrambler are thus at 00, 10 or 11. This stream is scrambled a second time by a scrambler B and the TSC bits of the scrambled stream A+B at the output of this scrambler are at 00, 10 or 11. The scrambler B, by positioning the TSC scrambling control bits of a packet, deletes in fact the preceding values of the TSC bits of this scrambled packet. Upon reception of a scrambled stream A+B, a first descrambling is carried out by a descrambling circuit B that repositions the TSC bits at 00, the stream obtained being nevertheless a scrambled stream A whose TSC bits are at 00. The second descrambler A receives this scrambled stream whose TSC bits are at 00. It considers then that this stream is not scrambled, according to the signification of its TSC bits, and provides therefore at its output the scrambled stream A with the TSC bits at 00 instead of the original stream. All of the packets at the input of the descrambling circuit A are considered as clear and remain therefore unchanged after the descrambling process. The solution to force the descrambling at the level of the descrambling circuit A cannot suit as the scrambling key parity information is not available.

This scrambling solution of the set of transport streams that can contain data already encrypted is therefore not suitable. There remains at least one solution of this type that would be from an operational point of view, the easiest to implement.

SUMMARY OF THE INVENTION

One of the purposes of the invention is to overcome the aforementioned disadvantages.

For this purpose, the aim of the invention is a scrambling method for an over-scrambling of a MPEG2 stream at least partially scrambled, the stream being structured in packets, a packet header comprising a PID field defining the service to which the packet is assigned, a TSC field, the TSC bits being relative to the scrambling of the packet, a continuity counter field, characterized in that it comprises the following steps:
  reading of an original PID and TSC bits in the PID and TSC fields of a packet header of said stream,
  writing of a temporary PID in a PID field in place of the original PID, function of the original PID value and TSC bits according to a correspondence table of an original PID and TSC bits with the temporary PIDs,
  writing of the value zero in the TSC field in place of the original value,
  scrambling of the stream with modified fields.

According to a particular embodiment, the choice of temporary PID is made from a predefined correspondence table attributing temporary PIDs according to the original PIDs in the stream and the value of TSC bits.

According to a particular embodiment, the choice of temporary PID is made from a correspondence table automatically calculated according to the signal received.

According to a particular embodiment, the method also comprises a reading step of the continuity counter value, the temporary PID is also a function of the continuity counter value, a different PID being attributed, for a same value of TSC bits, according to whether the continuity counter is at zero or other than zero.

The purpose of the invention is also a descrambling method for the descrambling of a MPEG2 stream at least partially over-scrambled, the over-scrambled stream being structured in packets, a packet header comprising a PID field defining the service to which the packet is assigned, a TSC field, the TSC bits being relative to the scrambling of the packet, a continuity counter field, characterized in that it comprises the following steps:
  descrambling of an over-scrambled stream to provide a scrambled stream,
  reading of a temporary PID in a PID field of a packet header of said scrambled stream,
  writing an original PID and TSC bits in the PID field and the TSC field of said scrambled stream, in place of the temporary PID and the TSC bits, the values being a function of a correspondence table of an original PID and TSC bits with temporary PIDs.

According to a particular embodiment, the choice of original PID is carried out according to a predefined correspondence table attributing for a temporary PID, values of the original PID and TSC bits.

According to a particular embodiment, the choice of original PID is carried out according to a predefined correspondence table transmitted in the data stream, attributing, for a temporary PID, values of the original PID and TSC bits.

According to a particular embodiment, the temporary PID being also a function of the value of the continuity counter, the method also comprises a writing step of a continuity counter value in the corresponding field, the value being zero when this temporary PID corresponds to a PID indicating a zero value of the counter in the original signal, then incremented according to the arrival of packets relating to the same original PID.

The purpose of the invention is also an over-scrambling device, characterized in that it comprises a MPEG2 stream scrambler, a second scrambled stream scrambler implementing the scrambling method above.

The purpose of the invention is also a descrambling device, characterized in that it comprises a MPEG2 stream descrambler implementing the above descrambling method, a descrambled stream descrambler.

Using this method, it is possible to realize a scrambling of MPEG data streams even if this latter contains a certain number of services already scrambled.

In overcoming the problems of scrambling of a complete stream, it is thus possible to manage in a flexible and independent manner the stream services, the scrambling of these services being able to be realized independently of the scrambling of the complete stream transporting these services.

BRIEF DESCRIPTION OF THE DRAWINGS

Other specific features and advantages will emerge clearly from the following description, the description provided as a non-restrictive example and referring to the annexed drawings wherein:
FIG. 4 shows the continuity counter error for a succession of packets of a service after PID renumbering,
FIG. 5 shows, the changes in the continuity counter with a new PID renumbering.

DETAILED DESCRIPTION OF THE EMBODIMENTS OF THE INVENTION

The terms used in the MPEG standard or relating to abbreviations are shown in brackets.

The transport stream is composed of packets of 188 octets, 4 header octets and up to 184 payload data octets. Only the payload data of packets are scrambled in the case of scrambling of a service.

The packet header comprises principally a synchronization octet, a PID (Packet IDentifier) of 13 bits indicating to which service component the packet belongs, 2 TSC (Transport Scrambling Control) bits relating to the scrambling and a continuity counter on 4 bits. As referred to previously, the TSC bits indicating if the packet is scrambled and with which control words. These control words typically change every 10 seconds alternating their parity, the control word transmitted for the following period being of the opposite parity to the control word for the current period.

A first PAT (Program Association Table) transported by the packets for which the PID indicator carries the number zero contains a list of services and their associated PIDs in the packets in which are found the service description. The PAT table is always transmitted in clear, even if all the programmes are scrambled. This associated PID transmits a second table called the PMT (Program Map Table) that supplies a list of components (video, audio, etc.) and their PIDs. This table then indicates, in clear, the PIDs of the elementary streams constituting the service.

Figure 1:
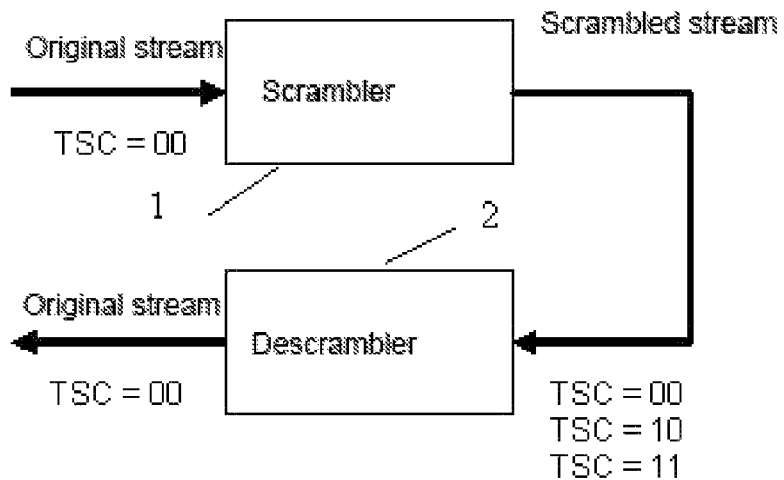
FIG. 1 shows a basic scrambling/descrambling system according to the prior art.
Figure 2:
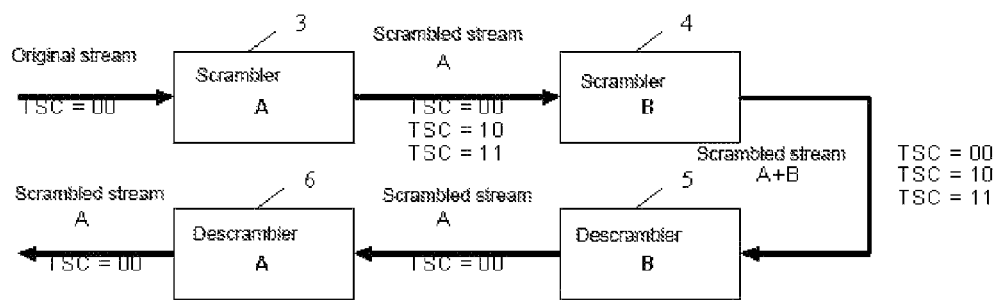
FIG. 2 shows the changes in TSC bits of a MPEG stream over-scrambling system.
Figure 3:
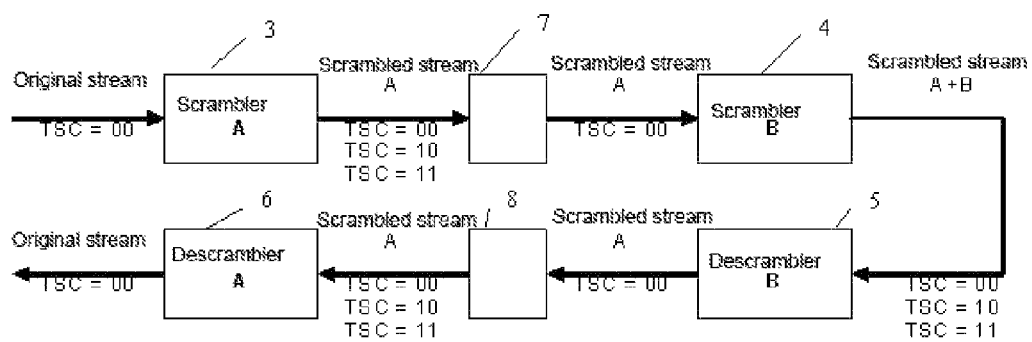
FIG. 3, shows an over-scrambling system according to the invention.

FIG. 3 shows a schema of the scrambling/descrambling system according to the invention. The circuit references similar to those of the preceding schema are conserved.

The original non-scrambled MPEG stream, therefore with the TSC bits having a value of 00, is transmitted to a first scrambler 3. The TSC bits of the scrambled stream A at the output of the scrambler have a value of 00, 10 or 11 depending on whether the packet considered is in a non-scrambled or scrambled state and in the second case, depending on the parity of the key used. This stream supplies a functional block 7 whose function is to force these TSC scrambling bits to the 00 value, whatever their preceding value and to memorize in the stream these preceding values. The scrambled stream A at the output of the block 7 is transmitted to a second scrambler 4 that carries out the over-scrambling of the stream A to transmit an over-scrambled stream A+B. The TSC scrambling bits taking the values 00, 10 or 11 depending on the packet considered, during this step and whether the preceding state is non-scrambled or scrambled and in this second case, depending on the parity of the key used. The over-scrambled stream A+B transmitted by the over-scrambler 4 is received by a first descrambler 5 that carries out the descrambling of this stream A+B and supplies a scrambled stream A. After this first descrambling, the TSC scrambling bits are positioned at the value 00. This scrambled stream A is transmitted to a second functional block 8 whose function is to force the TSC bits to the value of 00, 10 or 11 depending on the value of TSC bits memorized in the stream by the functional block 7. Finally, this scrambled stream A at the output of functional block 8 is transmitted to a second descrambler 6 that supplies at its output the original stream descrambled with the TSC bits at the value of 00.

The role of the functional block 7 is to recover the values of TSC bits of packets received, to force the TSC bits of packets transmitted to the value 00 but also to memorize the recovered values in the streams transmitted. The packets are not modified and retain the same status, scrambled or non-scrambled.

The role of the functional block 8 is to recover, in the received stream, the memorized values from TSC bits then force the TSC bits of transmitted packets, to the recovered values, 00, 10 or 11. The packets are not modified and retain the same state, scrambled or non-scrambled.

The payload data as well as the bitrate are not modified.

The initial values of TSC bits are indirectly memorized in the PID field of the packet header. These bits can be different for each packet of the same service. Hence for a given service corresponding to a PID number (hereafter the PID will be assimilated with its PID number) for which its binary value will be called "a", a temporary PID value will be assigned that is a function of the value of the TSC bits. If the temporary binary values relative to the PID of the original value "a" are called l, m, n and o the following correspondence table is produced:

CORRESPONDENCE TABLE 1

| Original PID value | TSC Bits | Temporary PID value |
|---|---|---|
| a | 00 | l |
| a | 01 | m |
| a | 10 | n |
| a | 11 | o |

The value 01 for the TSC bits is a reserved value. It is therefore not essential to code it and 3 PID values can be sufficient to define the useful values of TSC bits.

The functional block 7 carries out therefore a reading, in the fields corresponding to the packet headers, of original PID values and TSC bits values. According to these values, it rewrites, in the PID fields of the packet header of the scrambled stream, the temporary PID value, according to the correspondence table. Moreover, it forces, in the TSC field of this packet header, the TSC bits of the TSC field with the value 00.

The functional block 8 reads the temporary PID in the PID field of the packet header of the scrambled stream. It determines the initial value of the TSC bits and the original PID according to the correspondence table and rewrites these values in the PID ans TSC field of the packet header of the descrambled stream according to method B but still scrambled according to method A. The functional blocks 7 and 8 must of course have access to the same correspondence table. This correspondence table can be constructed manually or automatically, according to the PIDs available in the data stream, via the functional block 7. It can also be transmitted via the functional block 7 to the functional block 8, or by the two functional blocks 7 and 8, via the intermediary of the data stream, for example in the place of padding packets so as not to modify the bitrate. It can be inserted manually in the functional block.

The correspondence table can be created automatically by the functional block 7. For each a original PID, a list of 4 (or 3) PIDs (l, m, n, o) are used in the list of available PIDs and are then considered as essential, for use as temporary PIDs, for the other a original a PIDs. In the mode where the temporary PIDs l are identical to the a original PIDs, an inventory of the set of a PIDs of the original signal is carried out, prior to the allocation phase, these PID being marked as essential is the list of possible temporary PIDs.

All of the packets, including signalling, can have their PID modified. However the PSI/SI (Program Specific Information/Service Information) information are generally transmitted in clear in the signal, it would therefore be of no use to re-write their PIDs and their original values can be retained.

So as to minimise the correspondence table, each packet that is not described in the table, that is to say for which the original PID value does not appear in the correspondence table is considered as unchanged.

The PID value "I" in the table can be the initial "a" value relative to the service. The other values m, n and o are available PID values, not assigned to the origin of a service. Of course, it is supposed that the PID number used by the considered stream is less than the PID maximum number authorized by the MPEG standard (8192) at least of the number of PIDs to be reallocated. The stream must contain enough empty places to allow insertion of an inband command, that is to say transported by the stream and enabling the functional block 8 to automatically reconstruct the initial stream.

In the contrary case, account must possibly be taken of the PID values that could be used, equally as temporary values, to optimise transport and the stream transport. For example the transmission, in a same stream, on a part of the network for example of a centralized transmission point to a satellite receiver via the satellite, different services having finally, that is to say after this part of the network, a same PID, for example services relating to different regions. The correspondence tables, for these temporary values, are for example transmitted in place of padding packets so as not to modify the bitrate. In the case where such PID temporary values are used for services management in the scope of optimization of the transport stream, it is proposed, instead of corresponding to a single one of these temporary PIDs of a service PID, to assign to it 3 or 4 values according to the value of the TSC bits. For example, to the FR3 regional services having a same PID 200 at origin, instead of assigning a single temporary PID per region, for example 3000 or 4000 according to the region, to assign to it 3 or 4 temporary PIDs per region, for example 3000, 3001, 3002, 3003 for one region, 4000, 4001, 4002, 4003 for another region, depending on the value of the TSC bits of a regional service. It is thus possible to simultaneously realize a transport stream optimization and an over-scrambling of this stream.

The output signal of functional block 7 is a MPEG2 stream but it differs from the standard according to two points:

signalling incorrect

The new components created are not described in the signalling (PMT table) and are therefore considered as non-referenced components. Moreover, some components declared in signalling (PMT table are not present as the original PID are not retained, or are not present temporarily on the lung periods corresponding to the duration of scrambling A if the original PID is retained for the value of TSC bits equal to 00.

continuity error

The value of a continuity error is coded on 4 bits in the packet header. This counter increments, for a given PID, at each packet having this same PID. It thus enables the reception system to know, for a service, if the packets were lost in transmission.

The packets with the original PID are divided into packets with three new PIDs. Due to the fact that the continuity counter counts packets relative to the original PID and the fact that its value in the packet header field remains unchanged during the PID change, the stream generated by the functional block 7 contains continuity errors, the counting values being incremented on the packets that have maintained different PIDs. Thus, between the functional circuit 7 and the functional circuit 8, the continuity counters cannot be used for services whose PID is modified. The values of these counters are again correct for the streams at the output of the functional block 8.

An example of discontinuity is provided in FIG. 4 that shows, on a first line, a succession of packets scrambled in a standard way and symbolized by their PID of constant a value and their TSC bits whose values change according to the scrambling and the parity of the scrambling keys.

The second to fourth lines represent the transport stream at the output of functional block 7, so after renumbering of the PIDs. The packets are represented one line per PID for the purposes of clarity but these packets are of course transmitted successively according to a chronological axis, all lines combined. According to the method of the invention, the TSC bits are here all forced to the value 00. A counter continuity error is noted, for example for the packets relating to the PID of value n. In fact, this counter continues to be incremented according to the PID packet of value n referenced 9 while the transmitted packets have a different PID of value o. Thus, during the transmission of a next PID packet of value n referenced 10, the continuity counter has been incremented by 6 instead of 1 as it concerns the continuity counter relating to original a PID packets.

A solution to this discontinuity problem consists simply in not monitoring this aspect of the signal in the network between the functional block 7 and 8 and to carry out this test only at the output of functional block 8.

If it is required however to retain the possibility of monitoring the data transmission at every point of the network between the functional blocks 7 and 8 and, in particular to not have continuity index errors, a variant of the invention consists in extending the PID number available for renumbering. Four (or three) additional numbers are thus authorized for renumbering the PID. The new correspondence table is as follows:

CORRESPONDENCE TABLE 2

| Original PID value | TSC Bits | Continuity counter | Temporary PID value | |
|---|---|---|---|---|
| a | 00 | xxxx | l | Bank 1 |
| a | 01 | xxxx | m | |
| a | 10 | xxxx | n | |
| a | 11 | xxxx | o | |
| a | 00 | 0000 | p | Bank 2 |
| a | 01 | 0000 | q | |
| a | 10 | 0000 | r | |
| a | 11 | 0000 | s | |

The idea is to modify the continuity index of packets at the output of functional block 7 in order to comply with the standard and to use a mechanism enabling the regeneration of the initial value at he output of functional block 8, by the use of new PIDs. In another way, new PIDs are used to force, at the output of the functional block 8, the continuity counter to zero on detection of these new PIDs.

The functional block 7 implements the following algorithm:

when the value of the continuity counter is other than 0000, use of PIDs from the bank of values 1, when the value of the continuity counter is equal to 0000, use of PIDs from the bank of values 2, the counting of the original continuity counter is replaced by a counting carried out by a continuity counter correctly incremented on the base of new temporary PIDs. This independent continuity counter is thus used by the functional circuit 7 for the calculation of packet continuity indexes.

The functional block 8 implements the following algorithm:

a new count is carried out by a continuity counter for each of the PIDs, when the PID of the packet received corresponds to the bank of values 2, this continuity counter of the packet to be transmitted is forced to the value zero.

when the PID of the packet received corresponds to the bank of values 1, this continuity counter of the packet to be transmitted is incremented.

Hence, the continuity index is in line with the initial value upon reception of a packet from the bank 2, the signal being then correct and identical to the initial stream.

FIG. 5 provides an example of the implementation of this algorithm.

The first line represents the original transport stream corresponding to a succession of packets defined by their PIDs, the scrambling bits and the continuity counter. The PID has a constant value a, the scrambling bits change according to the scrambling and the even or odd keys used. The counter is incremented at each packet up to a value 15 (1111).

The transport stream, after implementation of the method, is shown, fragmented over several lines, one line per PID: Three PID values, l, n, o corresponding to the values 00, 10 and 11 of the TSC bits for a counter other than 0000 (bank 1), a PID value, s, corresponding to the value 11 of the TSC bits for a counter at 0000 (bank 2). The original PID a of the packets shown has thus been replaced by temporary PIDs l, n, o and s.

It is noted that, for each of the temporary PIDs, the continuity index is correctly incremented in accordance and in time with the transmission of packets relating to this PID. Thus, for example for the PID n, the continuity counter passes from the value 0101 to the value 0110 though in the time between the packets of the original PID were transmitted.

This mechanism assumes that there is no continuity error in the original stream, which corresponds to a normal operation. In the case where a continuity error occurs, the overall mechanism also generates a continuity error at a location other than that of the original stream. In fact, the functional block 8 carries out a reset to zero of the continuity counter of the packet with the original PID every time the temporary PID of a packet derived from this original PID corresponds to the bank of values 2. Next, the counting or incrementing being autonomous, that is to say independent of the continuity counter values of the original stream, with the exception of course of the value 0000, if a packet relating to this original PID is missing in the original stream, for example the packet 3 (0011) of PID a, the autonomous counter counts nevertheless this value 3 by carrying out an increment up to 14 (1110) instead of 15 (1111) before the next reset to zero. The packet considered as missing is the packet 15 and no longer the packet 3.

Thus, except for the system start-up until the first initialisation, that is to say after a maximum of 15 transmitted packets, and for the counting periods during which a packet is missing, the final signal contains the same continuity counter values as the original signal.

According to an embodiment of the invention, if it is required simply to monitor the continuity of the services continuity counter, without necessarily containing the original values of these counters, the correspondence table 1 is used, the functional block 7 carrying out an independent count for each of the temporary PIDs, these counted values being substituted for the original values.

According to another variant, if it is required to control this continuity only at the level of the final recovered stream, without the initial value of the continuity counter being recovered, a simple count can be implemented in the functional block 8 to generate continuity indexes for each of the recovered original PIDs. Thus, the continuity count used for the temporary PIDs, that were a function of the bank of values to which the temporary PID belonged, is replaced by a simple count incremented on the original PID recovered.

The invention can be applied to a complete scrambling/descrambling of the data stream or to a partial scrambling/descrambling of this stream, for example being applied to a number of services among those transported in the stream, whether it concerns the first or second scrambling or both. Naturally, the scramblers can be completely independent and different enabling great flexibility in the implementation of the system. Second level scrambling can even be optional while retaining the functional blocks, a same device, scrambler 3+functional block 7, can be used indifferently in either systems with second scrambling or in systems without second scrambling.

The invention is described in the preceding text as an example. It is understood that those skilled in the art are capable of producing different variants of the method described without leaving the scope of the invention.

The invention claimed is:

1. Scrambling method for an over-scrambling of a MPEG2 stream at least partially scrambled, the stream being structured in packets, a packet header comprising a packet identifier (PID) field defining the service to which the packet is affected, a transport scrambling control (TSC) field, the TSC field having bits being relative to the scrambling of the packet, a continuity counter field, comprising the following steps:

reading of an original PID and TSC bits in the PID and TSC fields of a packet header of said stream, writing of a temporary PID in a PID field in place of the original PID, as a function of the original PID value and TSC bits according to a correspondence table of an original PID and TSC bits with the temporary PIDs, and overscrambling of the stream with modified fields.

2. Method according to claim 1, wherein the choice of temporary PID is made from a predefined correspondence table attributing temporary PIDs according to the original PIDs in the stream and the value of TSC bits.

3. Method according to claim 1, wherein the choice of temporary PID is made from a correspondence table automatically calculated according to the signal received.

4. Method according to claim 1, comprising a reading step of the continuity counter value and wherein the temporary PID is also a function of the continuity counter value, a different PID being attributed, for a same value of TSC bits, according to whether the continuity counter is at zero or other than zero.

5. Descrambling method for descrambling of a MPEG2 stream at least partially over-scrambled, the over-scrambled stream being structured in packets, a packet header comprising a packet identifier (PID) field defining the service to which the packet is affected, a transport scrambling control (TSC) field, the TSC bits being relative to the scrambling of the packet, a continuity counter field, comprising the following steps:

descrambling of an over-scrambled stream to provide a scrambled stream, reading of a temporary PID in a PID field of a packet header of said scrambled stream, writing of an original PID and TSC bits in the PID field and the TSC field of said scrambled stream, in place of the temporary PID and the TSC bits, the values being a function of a correspondence table of an original PID and TSC bits with temporary PIDs.

6. Method according to claim 5, wherein the choice of original PID is carried out according to a predefined correspondence table attributing for a temporary PID, values of the original PID and TSC bits.

7. Method according to claim 5, wherein the choice of original PID is made according to a correspondence table transmitted in the data stream, attributing, for a temporary PID, values of the original PID and TSC bits.

8. Method according to claim 5, wherein the temporary PID is also a function of the value of the continuity counter, also comprising a writing step of a continuity counter value in the corresponding field, the value being zero when this temporary PID corresponds to a PID indicating a zero value of the counter in the original signal, then incremented according to the arrival of packets relating to the same original PID.

9. Over-scrambling device, comprising a MPEG2 stream scrambler, a second scrambled stream scrambler implementing the method of claim 1.

10. Descrambling device comprising a MPEG2 stream descrambler implementing the method of claim 5, a descrambled stream descrambler.

11. The Method according to claim 1, further comprising the step of writing of the value zero in the TSC field in place of the original value.

\* \* \* \* \*